United States Patent [19]

Ishiguro

[11] Patent Number: 5,659,811
[45] Date of Patent: Aug. 19, 1997

[54] BLUR PREVENTING DEVICE FOR AN ANTICIPATING DRIVE AUTO-FOCUS CAMERA

[75] Inventor: Yasuaki Ishiguro, Fujimi, Japan

[73] Assignee: Nikon Corporation, Tokyo, Japan

[21] Appl. No.: 573,756

[22] Filed: Dec. 18, 1995

Related U.S. Application Data

[63] Continuation of Ser. No. 219,167, Mar. 28, 1994, abandoned.

[30] Foreign Application Priority Data

Mar. 31, 1993 [JP] Japan ................................. 5-073773

[51] Int. Cl.$^6$ ................... G03B 13/36; G03B 19/12
[52] U.S. Cl. ................ 396/95; 396/242; 396/263; 396/358
[58] Field of Search ....................... 354/400, 402, 354/403, 267.1, 238.1; 396/65, 67, 89, 95, 153, 213, 238, 242, 263, 264, 354, 358

[56] References Cited

U.S. PATENT DOCUMENTS

5,092,673  3/1992  Hayashi ....................... 396/358
5,321,459  6/1994  Venaka ......................... 396/95

*Primary Examiner*—Safet Metjahic
*Assistant Examiner*—J. K. Han
*Attorney, Agent, or Firm*—Oliff & Berridge

[57] ABSTRACT

In the blur prevention mode, which prevents photographic blurring caused by the vibration of the camera body which occurs when the mirrors are elevated, an anticipated drive quantity required for focusing the taking lens on a moving photographic subject at the time of exposure is calculated based on the results of distance measurement and a drive quantity equivalent to the distance traveled by the image surface of the moving photographic subject during the time T by which the exposure operation is delayed after mirror elevation is also calculated based on the results of distance measurement to be added to the anticipated drive quantity. The taking lens is driven in the amount of the total drive quantity that is the result of this addition. At the same time, the mirrors are elevated and then exposure is performed when the delay time T has elapsed after the mirrors are fully elevated.

10 Claims, 9 Drawing Sheets

RELEASE SIG
ON

BLUR PREVENTING DEVICE FOR AN ANTICIPATING DRIVE AUTO-FOCUS CAMERA

This is a Continuation of application Ser. No. 08/219, 167, filed Mar. 28, 1994, now abandoned.

BACKGROUND OF THE INVENTION

1. Field of the Invention

The present invention relates to a camera which follows a moving photographic subject and focuses the taking lens at the time of exposure.

2. Related Background Art

In the prior art, a camera provided with an anticipating drive automatic focus adjustment device that follows a moving photographic subject while driving the taking lens and, upon the release of the shutter, calculates an anticipated drive quantity required for focusing the taking lens on the moving subject at the time of exposure and drives and focuses the taking lens in conformance with this anticipated drive quantity, is known.

Also known is a camera which prevents the blurring of photos caused by a vibration of the camera body that occurs when the mirrors are elevated. With this blur preventing camera, since exposure is started when a preset delay time has elapsed after the completion of the elevation of the mirrors, the vibration of the camera body caused by the elevation of the mirrors is sufficiently attenuated by the time exposure starts and as a result, photographs free of blurring can be achieved.

However, on a camera that is provided with an anticipating drive automatic focus adjustment device, a problem of inaccurate focus arises when blur prevention is implemented when the mirrors are elevated because the time lag from the start of mirror elevation to the start of exposure is lengthened by the delay time for blur prevention and consequently, the taking lens does not focus on the moving subject at the time of exposure.

SUMMARY OF THE INVENTION

The object of the present invention is to implement photographing with precise focusing while preventing photographic blurs when the mirrors are elevated and also while following a moving photographic subject.

In order to achieve the object described above, the present invention is applied to a camera provided with a first calculator coupled to a rangefinder and adapted to calculate the required anticipated drive quantity based upon the results of distance measurement performed by the rangefinder for focusing the taking lens onto a moving photographic subject at the time of exposure and a lens drive that drives the taking lens according to the anticipated drive quantity calculated by the first calculator.

The camera according to the present invention is also provided with a mode selector that selects the blur prevention mode for preventing photographic blur caused by the vibration of the camera body which occurs when the mirrors are elevated, a timer that, when the blur prevention mode is selected by the mode selector, delays the exposure operation of the exposure device by a preset length of time after the mirrors are elevated, a second calculator coupled to the rangefinder and adapted to calculate the quantity of drive equivalent to the distance that the image surface of the moving subject moves during the delay time based upon the results of the distance measurement performed by the rangefinder, and a lens control coupled to the first and the second calculator and to the lens drive, the lens control adapted, when the blur prevention mode has been selected the mode selector, to add the drive quantity calculated by the second calculator to the anticipated drive quantity calculated by the first calculator and to drive the taking lens with the lens drive according to the drive quantity resulting from that addition.

When the blur prevention mode is selected, the anticipated drive quantity required for focusing the taking lens on the moving photographic subject at the time of exposure is calculated based on the results of the distance measurement and, at the same time, the drive quantity equivalent to the distance traveled by the image surface of the moving photographic subject during the time T by which the exposure operation is delayed after the mirrors are elevated, is calculated based on the results of the distance measurement, which is then added to the anticipated drive quantity. The taking lens is driven according to the drive quantity that is the result of that addition while the mirrors are being elevated and exposure is performed when the delay time T has elapsed after the completion of mirror elevation.

With this, it becomes possible to focus the taking lens on the moving photographic subject at the time of exposure and to photograph the moving photographic subject with accurate focus and no blurring even when exposure is delayed after the mirror elevation in order to prevent photographic blurring caused by the elevation of the mirrors.

In order to achieve the above objective, the present invention is also applied to a camera that calculates an anticipated drive quantity required for focusing the taking lens on a moving photographic subject at the time of exposure based upon the results of the distance measurement and drives the taking lens according to the calculated anticipated drive quantity.

The camera according to the present invention is also provided with a mode selector that selects either the blur prevention mode for preventing photographic blur caused by the vibration of the camera body which occurs when the mirrors are elevated, or the normal photographing mode, a timer that, when the blur prevention mode is selected by the mode selector, delays the exposure operation of the exposure device by a preset length of time after the mirrors are elevated by the mirror drive, and a mirror control that, when the blur prevention mode is selected by the mode selector, starts the mirror elevation operation with the mirror drive sooner than when the normal photographing mode is selected, by a preset length of time that has been set on the timer.

When the blur prevention mode is selected, the anticipated drive quantity required for focusing the taking lens on the moving photographic subject at the time of exposure is calculated based on the results of the distance measurement and the taking lens is driven according to the anticipated drive quantity that has been calculated. The mirror elevation starts earlier than in the normal photographing mode by a preset length of time T and exposure is performed when the delay time T has elapsed after the completion of mirror elevation.

With this, it becomes possible to focus the taking lens on the moving photographic subject at the time of exposure and to photograph the moving photographic subject with accurate focus and no blurring even when exposure is delayed after the mirror elevation in order to prevent photographic blurring caused by the elevation of the mirrors.

DESCRIPTION OF THE PREFERRED EMBODIMENTS

First Embodiment

Figure 1:
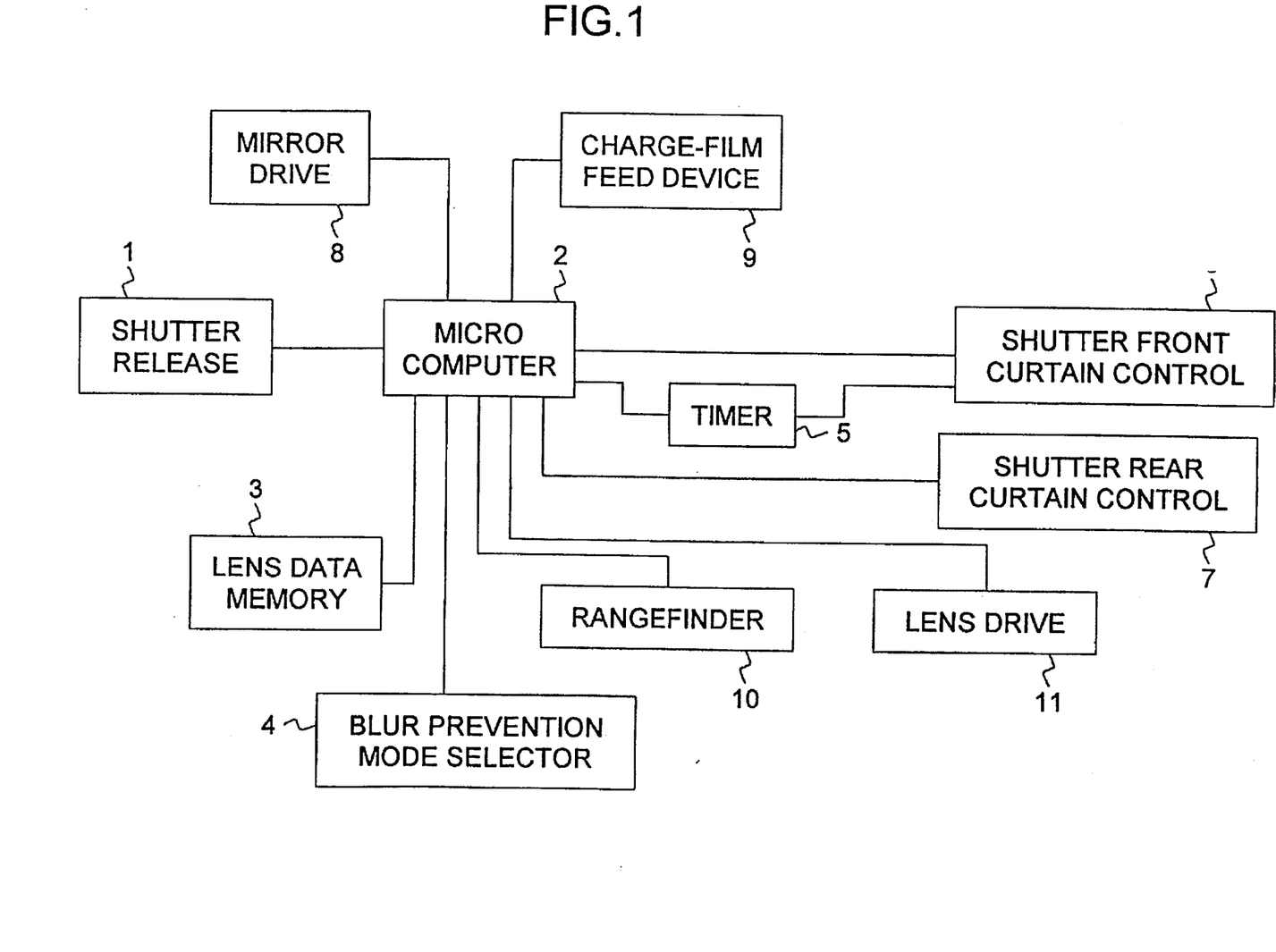
FIG. 1 is a block diagram showing the structure of the first embodiment.

FIG. 1 is a block diagram showing the structure of the first embodiment.

The shutter release 1 comprises a release button and a release switch that is turned on when the release button is pressed down and it outputs a release signal to the microcalculator 2 when the shutter is released. The lens data memory 3 is provided inside the lens barrel (not shown) and it stores in its memory data such as the focal length and the aperture stop value (smallest f-number) inherent to a particular taking lens. These data are read out by the microcalculator 2 as necessary.

The blur prevention mode selector 4 consists of a lever for switching between the blur prevention mode and the normal photographing mode and a switch that is turned on when the blur prevention mode has been selected with the lever and it outputs a blur prevention mode set signal to the microcalculator 2 when the blur prevention mode has been selected.

The timer 5 is a timer for delaying the operation of the shutter front curtain and when the blur prevention mode is selected, the microcalculator 2 outputs a front curtain control signal to the shutter front curtain control 6 via the timer 5. On the other hand, if the normal photographing mode is selected, the microcalculator 2 outputs the front curtain control signal directly to the shutter front curtain control 6 without going through the timer 5. As a result, the operation of the shutter front curtain delayed by the preset delay time that has been preset in the timer 5 only in the blur prevention mode.

The shutter front curtain control 6 releases the shutter front curtain upon receiving the front curtain control signal from the microcalculator 2 and starts the operation of the front curtain. The shutter rear curtain control 7 releases the shutter rear curtain upon receiving the rear curtain control signal from the microcalculator 2 and starts the operation of the rear curtain.

The mirror drive 8 drives the main mirror and sub mirror provided inside the camera body according to a mirror drive signal sent from the microcalculator 2 and it performs mirror elevation, that is, it retracts the mirrors from the photographic light path at the time of exposure.

The charge-film feed device 9 feeds the film according to a control signal sent from the microcalculator 2 and also charges the shutter and the mirrors.

The rangefinder 10 may employ either of the following methods: the first method in which the photographing distance to the photographic subject is measured by using the principle of triangulation, or the second method in which the defocus quantity, which indicates the focus adjustment state of the taking lens, is detected by analyzing the image of the photographic subject formed by the taking lens on the autofocus sensor and then by determining where the best image is formed. The rangefinder that employs the first method will employ either the passive or the active type triangulation method and the rangefinder using the second method may employ the contrast detection method or the phase difference detection method. The microcalculator 2 calculates the drive quantity required for focusing the taking lens on a stationary photographing subject based upon the results of distance measurement performed by the rangefinder 10. Also, if the photographing subject is moving, it calculates an anticipated drive quantity required for focusing the taking lens at the time of exposure based upon the results of distance measurement.

The lens drive 11 comprises a motor, its drive circuit, a drive mechanism and the like, and it drives the taking lens according to the drive quantity sent from the microcalculator 2.

Figure 2A:
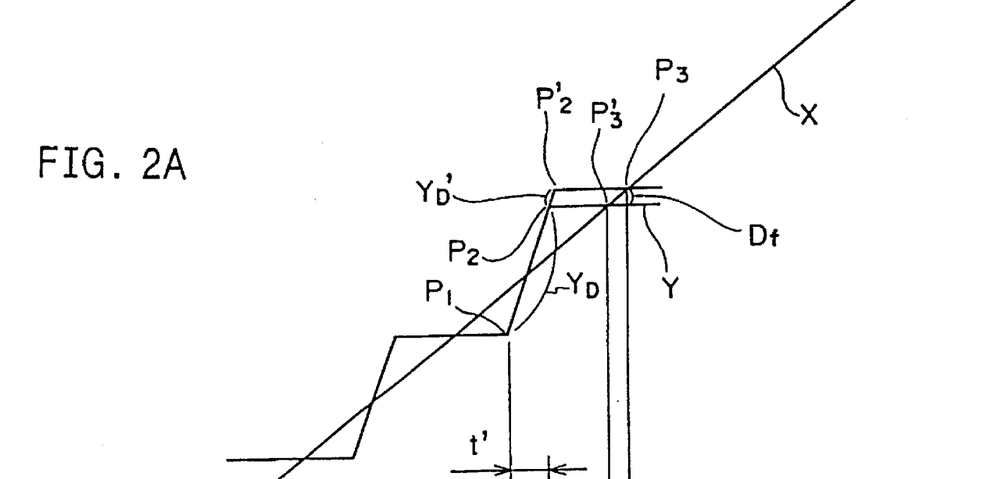
FIGS. 2A, 2B and 2C are explanatory diagrams that illustrate the movement of the taking lens, the image forming surface of the photographic subject and the mirrors, in the first embodiment.
Figure 2B:
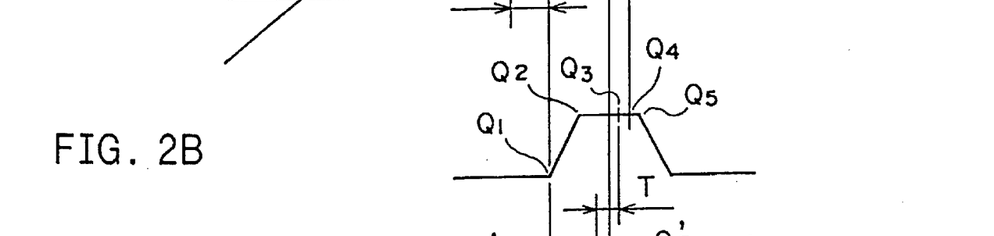
Figure 2C:
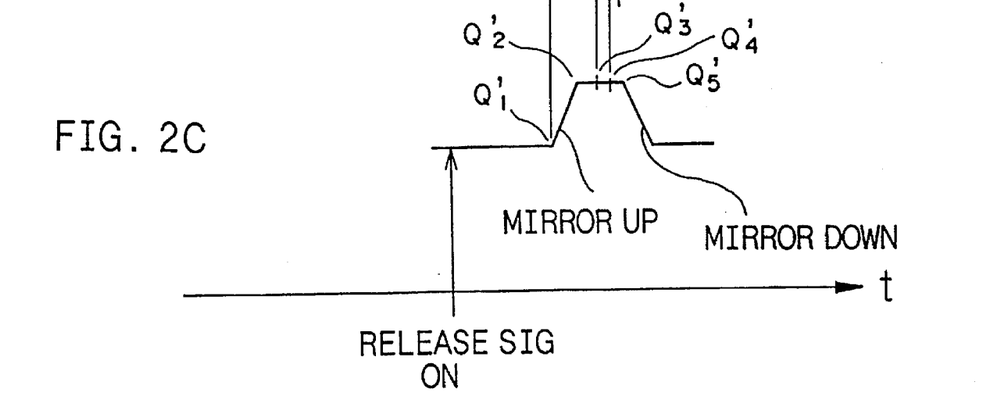

FIGS. 2A through 2C are time charts showing the movements of the taking lens, the image forming surface of the photographic subject and the mirrors in the first embodiment. FIG. 2A shows the position Y of the taking lens and the position X of the photographic subject image forming surface. FIG. 2B shows the movement of the mirrors in the blur prevention mode and FIG. 2C shows the movement of the mirrors in the normal photographing mode.

When the shutter is released at a point in time indicated by the "release Sig ON" in the normal photographing mode, the mirrors start to be elevated at the time Q1', that is, when time t' has elapsed after the start of lens drive P1. Thereafter, the time starting when the shutter front curtain starts to operate until the point in time when the shutter rear curtain completes its operation is considered to be the exposure period and the mid point of this exposure period is referred to as the central point of the exposure. Following the completion of the mirror elevation at the point Q2', when the shutter front curtain starts operation at the point Q3', the procedure reaches the central point of exposure at Q4'. The taking lens begins to be driven at P1 and the driving is completed at P2 when the taking lens has been driven in the amount of the anticipated drive quantity YD required for focusing it on the moving photographing subject at the time of exposure. This anticipated drive quantity YD is determined by taking into consideration a distance that the photographic subject image surface travels during the time period between mirror elevation and exposure. By driving the taking lens and the mirrors in this manner, the taking lens enters the focussed state P3' at the point Q4' and as a result, an accurately focussed photograph of the moving photographic subject is obtained.

On the other hand, if the blur prevention mode is selected, the operation of the shutter front curtain is delayed by the preset length of delay time T compared to the start time in the normal photographing mode, and starts at the point Q3. As a result, the central point of exposure Q4 in the blur prevention mode is delayed by the delay time T compared to that in the normal photographing mode. Therefore, the taking lens becomes unfocused in relation to the moving photographic subject and, as shown in FIG. 2A, the defocus quantity Df is generated. Note that for the delay time T, the time that allows sufficient attenuation of the vibration of the camera body after the elevation of the mirrors are set.

In order to solve this problem, in the first embodiment, when the blur prevention mode is selected, the lens drive quantity YD' that is equivalent to the defocus quantity Df that is generated during the delay time T is added to the lens drive quantity YD immediately before exposure, and the taking lens is driven for a total drive quantity of (YD+YD'). The lens drive YD' is calculated with the following formula:

$$YD'=VX*T \quad (1)$$

Here, VX represents the speed at which the image surface of the moving photographic subject moves.

As a result, the taking lens enters the focussed state P3 at the central point Q4 of exposure and it is possible to focus the taking lens on the moving photographic subject even if the start of shutter front curtain operation is delayed for the purpose of blur prevention.

Figure 3A:
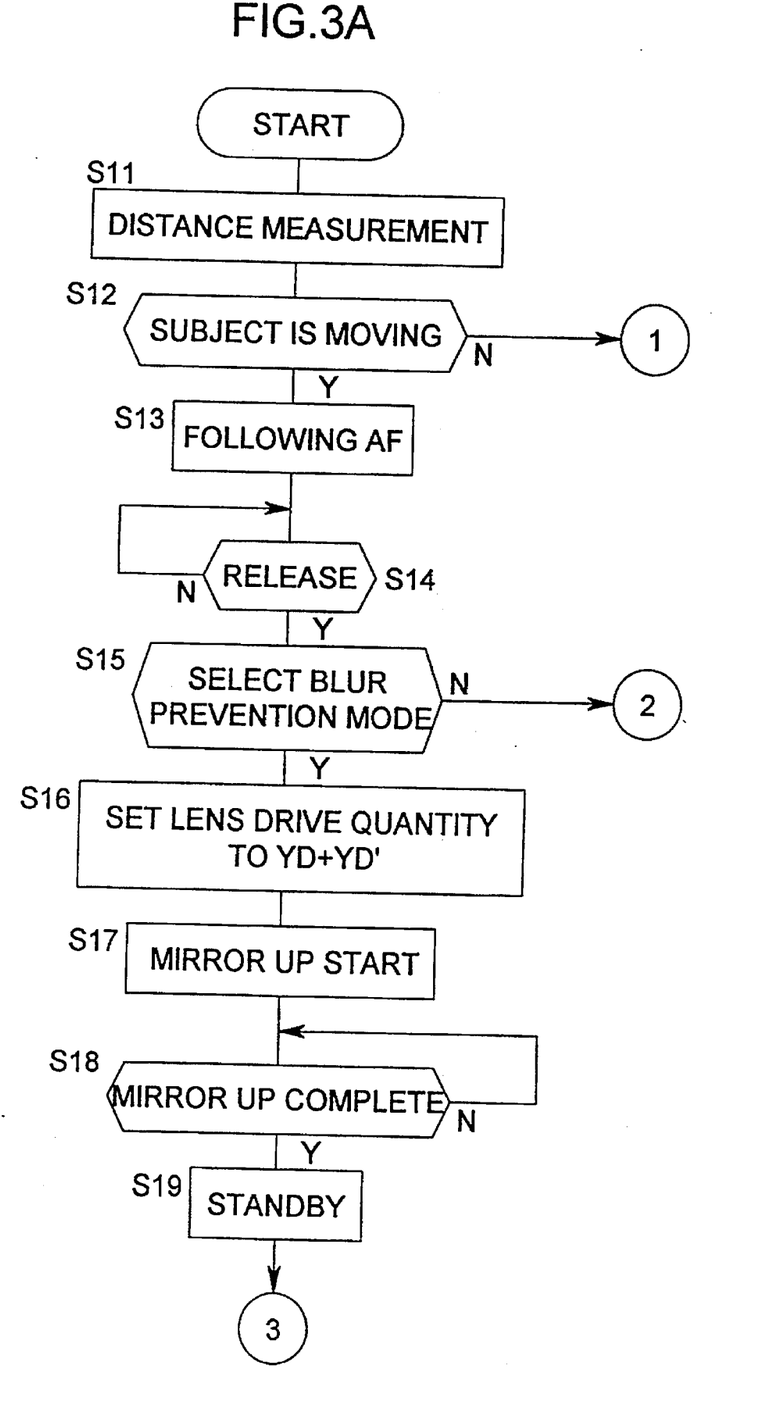
FIGS. 3A, 3B and 3C are flow charts of the operation in the first embodiment.
Figure 3B:
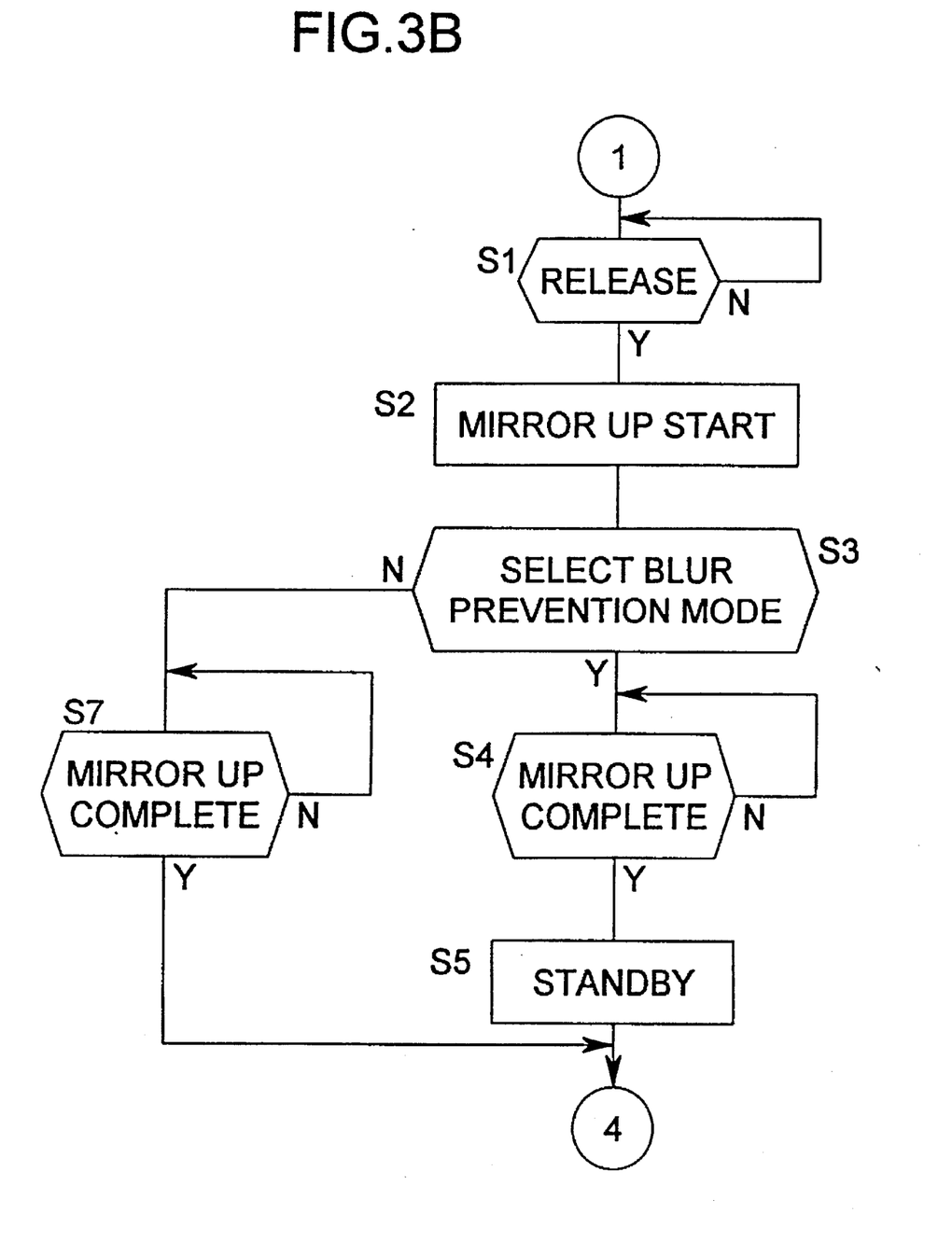
Figure 3C:
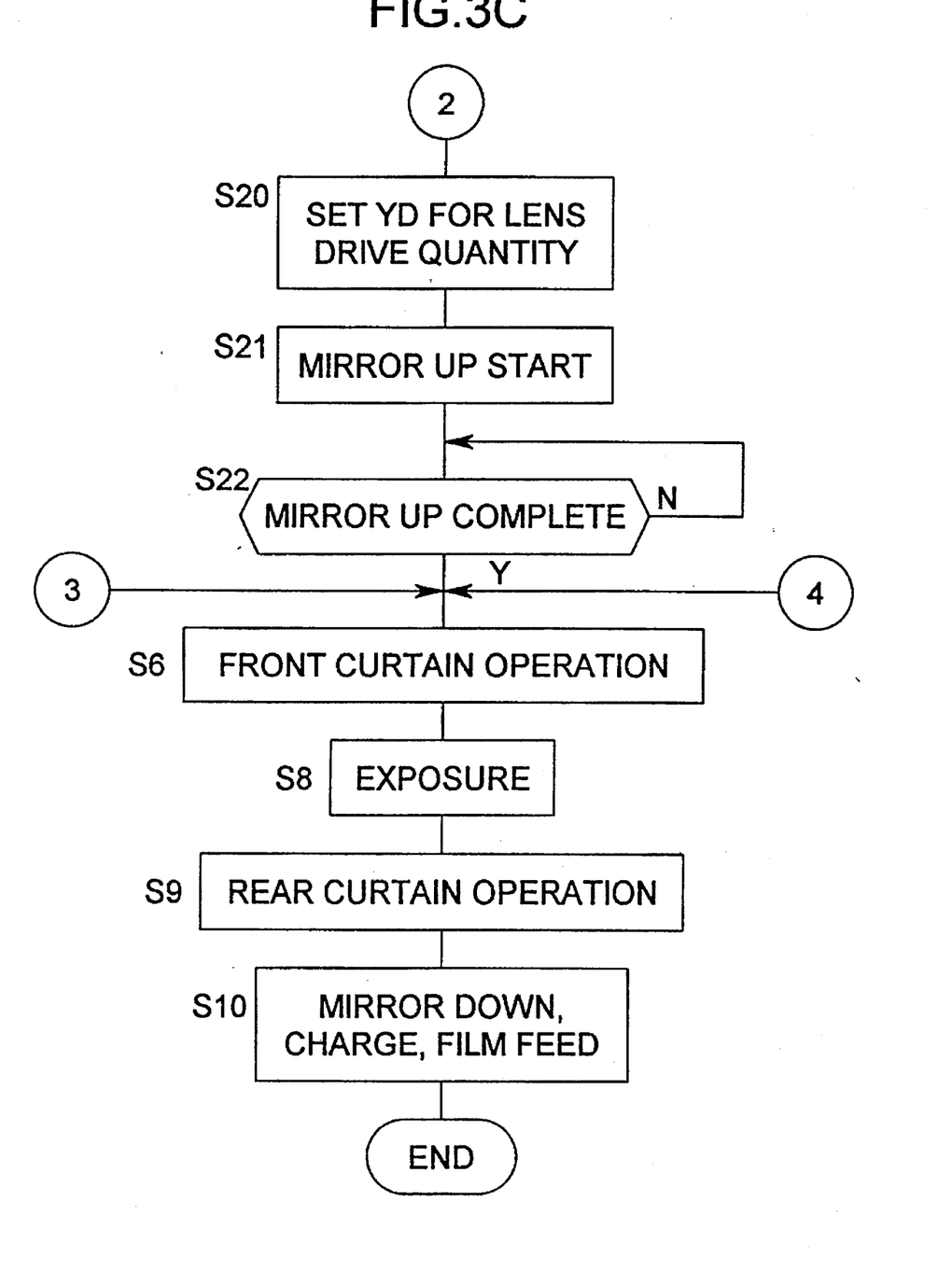

The operation of the first embodiment is explained in reference to the flow charts shown in FIGS. 3A through 3C. When the release button on the shutter release 1 is pressed halfway down, the operation shown in these flow charts is started. In step S11, the rangefinder 10 measures the distance and then in the next step, S12, the decision is made in conformance with the results of the distance measurement as to whether or not the photographic subject is moving. Various methods have already been disclosed as to methods by which stationary states and moving states of a photographic subject can be determined, and as it does not bear directly on the present invention, the explanation of this process is omitted.

If the photographic subject is determined to be stationary, the operation proceeds to step S1, in which a decision is made as to whether or not the shutter has been released by the shutter release 1. If it has been released, the operation proceeds to step S2, to start the elevation of the main mirror and the sub mirror by the mirror drive 8. In step S3 that follows, a decision is made as to whether or not the blur prevention mode has been selected by the blur prevention mode selector 4. If the blur prevention mode has been selected, the operation proceeds to step S4, if the normal photographing mode is selected, the operation proceeds to step S7.

If the blur prevention mode is selected, a decision as to whether or not the mirrors have been fully elevated is made in step S4. If they are fully elevated, the operation proceeds to step S5. In step S5, the operation remains in standby for a preset length of delay time that is set on the timer 5. When the delay time has elapsed, the operation proceeds to step S6, in which the operation of the shutter front curtain is started by the shutter front curtain control 6.

On the other hand, in the normal photographing mode, a decision as to whether or not the mirrors have been fully elevated is made in step S7. When the mirrors are fully elevated, the operation proceeds to step S6, to start the operation of the shutter front curtain.

Exposure is performed in step S8, and in step S9 that follows, the shutter rear curtain is operated by the shutter rear curtain control 7. Then in step S10, the main mirror and the sub mirror are reset to their initial positions by the charge-film feed device 9 and at the same time the film is fed to end one cycle of the photographing operation.

If, in step S12, the photographic subject is determined to be moving, the processing of step S13 and subsequent steps is implemented. First, in step S13, the taking lens is driven to follow up the moving photographic subject. In step S14, a decision is made as to whether or not the shutter has been released by the shutter release 1. If it has been released, the operation proceeds to step S15, in which a decision as to whether or not the blur prevention mode has been selected by the blur prevention mode selector 4 is made. If the blur prevention mode has been selected, the operation proceeds to step S16. If the normal photographing mode is selected, the operation proceeds to step S20.

In the normal photographing mode, as described in step S20 above, an anticipated drive quantity YD is set for the lens drive quantity to drive the taking lens with the lens drive 11, and the mirrors start to be elevated by the mirror drive 8, in step S21. In step S22, a decision is made as to whether or not the mirrors have been fully elevated and if they have been fully elevated, the operation proceeds to step S6. Note that whether or not the mirrors are fully elevated may be detected by, for instance, providing a sensor for mirror elevation completion detection in the mirror drive 8. Then, in steps S6 through S10, the exposure processing and post-exposure processing, as described above, are performed.

If it is determined in step S15 that the blur prevention mode is selected, then in step S16, a drive quantity that takes into consideration the delay time T required for the blur prevention mode (YD+YD') is set for the lens drive quantity as explained above and the taking lens is driven. Then in step S17 that follows, the mirrors start to be elevated and the operation proceeds to step S18, in which a decision is made as to whether or not the mirrors have been fully elevated. If the mirrors have been fully elevated, the operation proceeds to step S19, in which the operation remains in standby for the delay time T which is preset for the blur prevention mode. When the delay time T has elapsed, the operation proceeds to step S6, to perform the exposure processing and post-exposure processing, as described above.

As has been explained so far, when the blur prevention mode for preventing photographic blurs caused by the vibration of camera body which occurs when the mirrors are elevated, is selected, the anticipated drive quantity YD required for focusing the taking lens on the moving photographic subject at the time of exposure is calculated based on the results of the distance measurement and, at the same time, the drive quantity YD' that is equivalent to the distance traveled by the image surface of the moving photographic subject during the time T, by which the exposure operation is delayed after the mirrors are elevated, is calculated based on the results of the distance measurement, which is then added to the anticipated drive quantity YD. The taking lens is driven in the amount of the total drive quantity that is the result of that addition (YD+YD') while the mirrors are being elevated, and exposure is performed when the delay time T has elapsed after the completion of mirror elevation. With this, it becomes possible to focus the taking lens on the moving photographic subject at the time of exposure and to photograph the moving photographic subject with accurate focus and no blurring, even when exposure is delayed after mirror elevation in order to prevent the photographic blurring caused by the elevation of the mirrors.

Second Embodiment

In the first embodiment described above, in order to compensate for the defocus quantity Df generated during the delay time T in the blur prevention mode, the lens drive quantity YD' which is equivalent to the defocus quantity Df is added to the anticipated drive quantity YD and the taking lens is driven in the amount of the total drive quantity that is the result of that addition (YD+YD'). The second embodiment, in which the mirror elevation is set to start sooner by the length of the delay time T in comparison to in the normal photographing mode, is now explained. Note that the structure of the second embodiment is identical to that of the first embodiment shown in FIG. 1, and its illustration and explanation are, therefore, omitted.

Figure 4A:
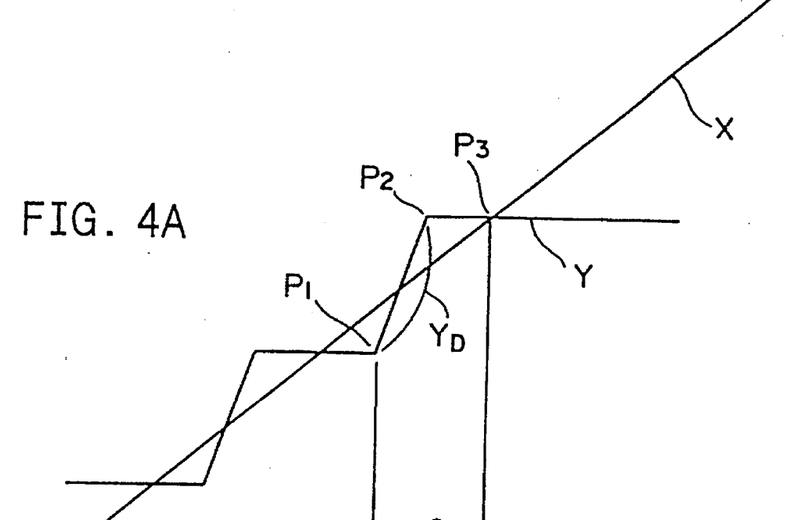
FIGS. 4A, 4B and 4C are explanatory diagrams that illustrate the movement of the taking lens, the image forming surface of the photographic subject and the mirrors, in the second embodiment.
Figure 4B:
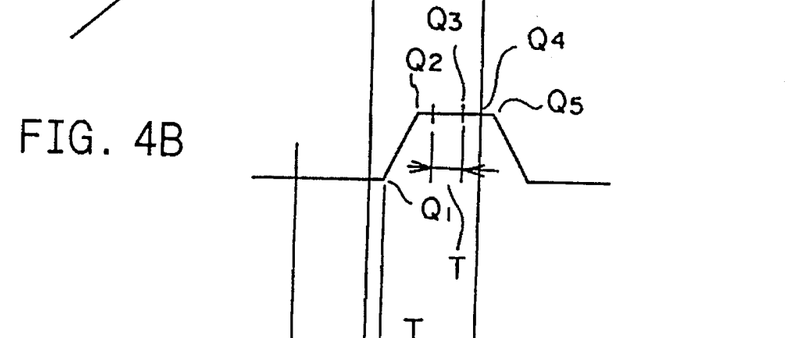
Figure 4C:
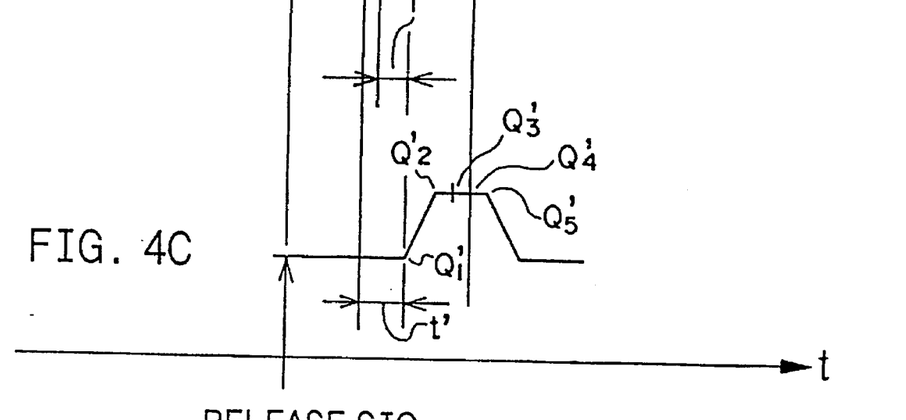

FIGS. 4A through 4C are time charts showing the movements of the taking lens, the image forming surface of the photographic subject and the mirrors in the second embodiment. FIG. 4A shows the position Y of the taking lens and the position X of the photographic subject image forming surface. FIG. 4B shows the movement of the mirrors in the blur prevention mode and FIG. 4C shows the movement of the mirrors in the normal photographing mode.

When the shutter is released at a point in time indicated by the "release Sig ON" in the normal photographing mode, the mirrors start to be elevated at the time Q1', that is, when time t' has elapsed after the lens drive start P1. Following the completion of mirror elevation, at the time Q2' and when the shutter front curtain starts operation at the time Q3', the procedure reaches the central point of exposure at Q4'. The taking lens begins to be driven at P1 and the driving is completed at P2 when the taking lens has been driven for the anticipated drive quantity YD required for focusing it on the moving photographic subject at the time of exposure. This anticipated drive quantity YD is determined by taking into consideration the distance that the photographic subject image surface travels during the time period between mirror elevation and the time of exposure. By driving the taking lens and the mirrors in this manner, the taking lens enters the focussed state P3 at the time Q4' and as a result, a photograph of the moving photographic subject with accurate focus is obtained.

On the other hand, if the blur prevention mode is selected, the mirrors start to be elevated at Q1 which is hastened by the delay time T compared to the time Q1' in the normal photographing mode. The operation of the shutter front curtain starts at the time Q3 when the delay time T has elapsed after the mirrors are fully elevated at Q2. Since the start of mirror elevation is set earlier by the delay time T compared to that in the normal photographing mode, the taking lens enters the focussed state P3 at the central point of exposure Q4 even though the operation of the shutter front curtain is delayed by the delay time T after mirror elevation. With this, the taking lens can be focused on a moving photographic subject even if the start of shutter front curtain operation is delayed to prevent blurring.

Figure 5A:
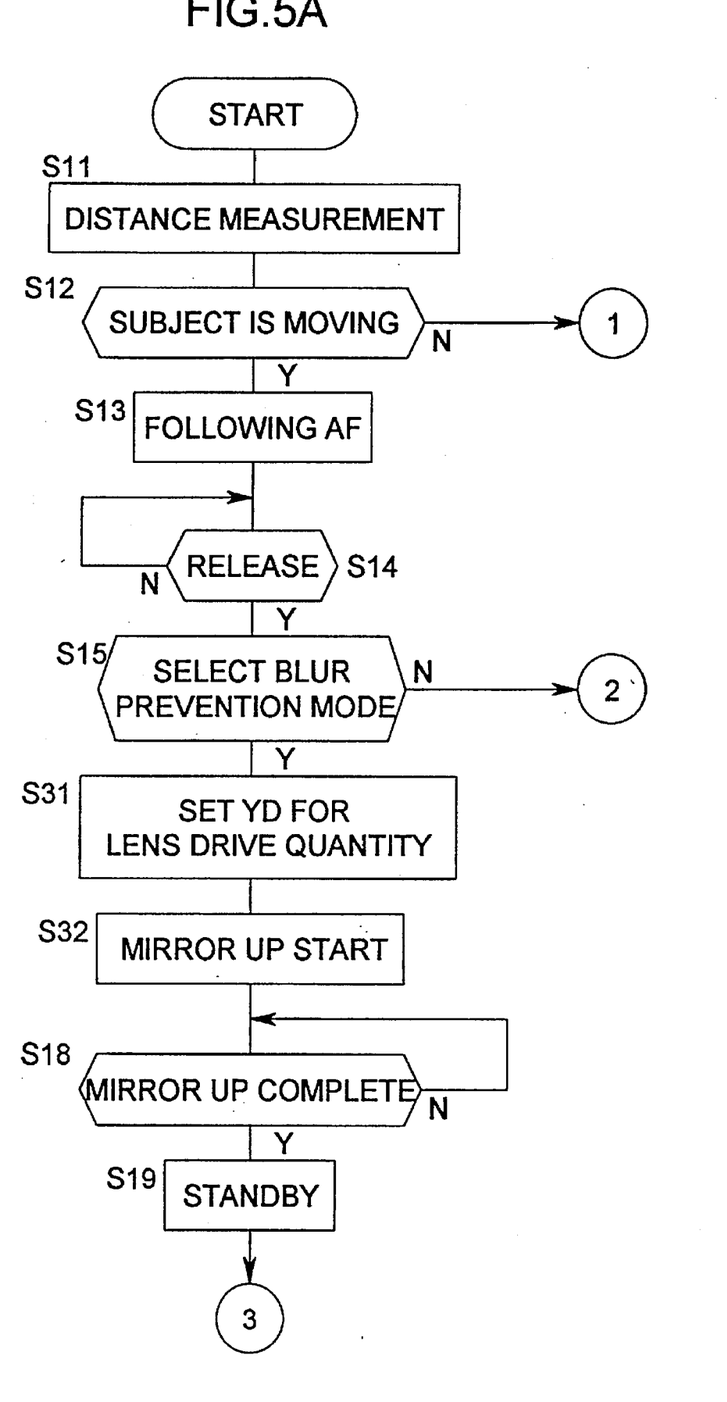
FIGS. 5A, 5B and 5C are flow charts of the operation in the second embodiment.
Figure 5B:
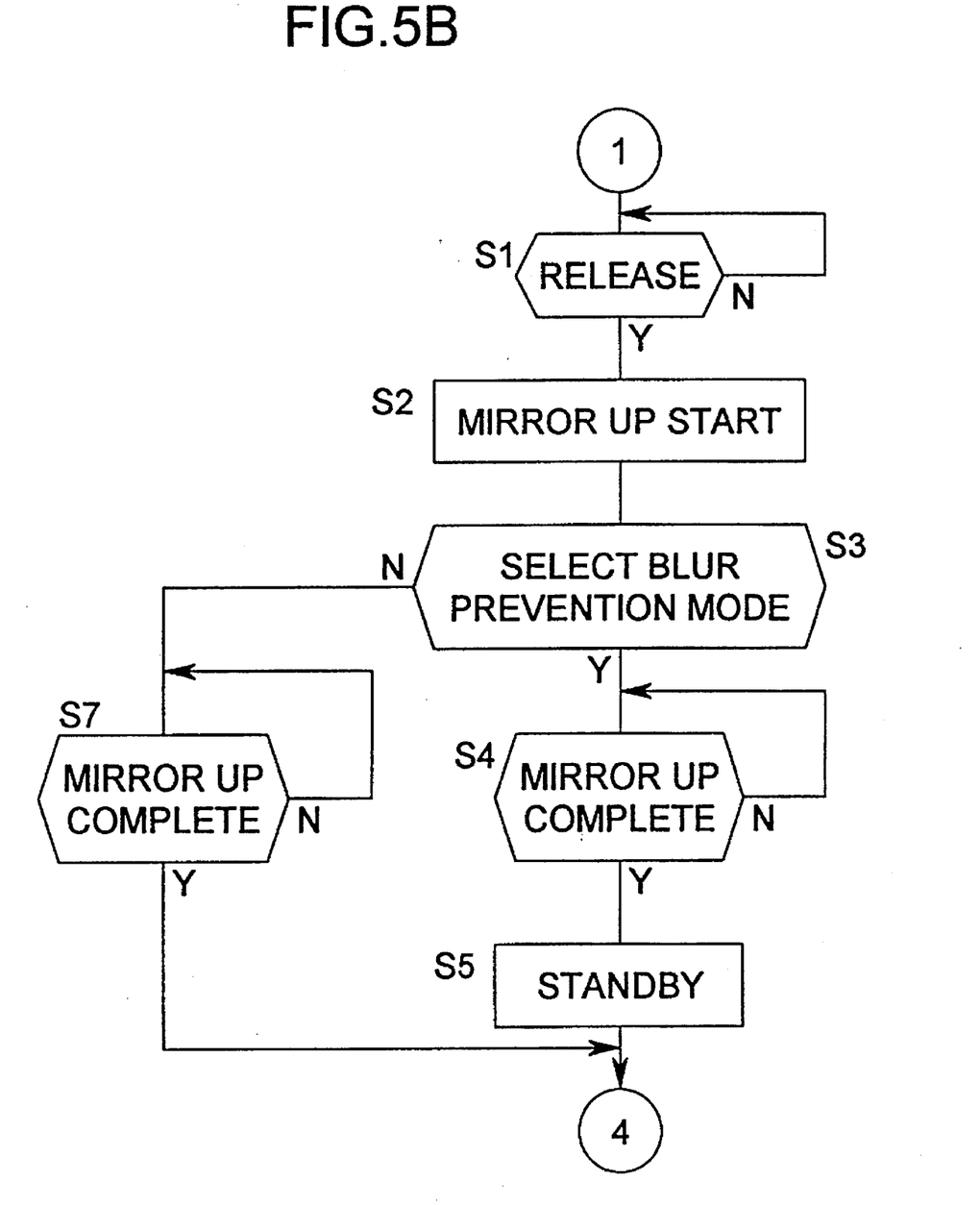
Figure 5C:
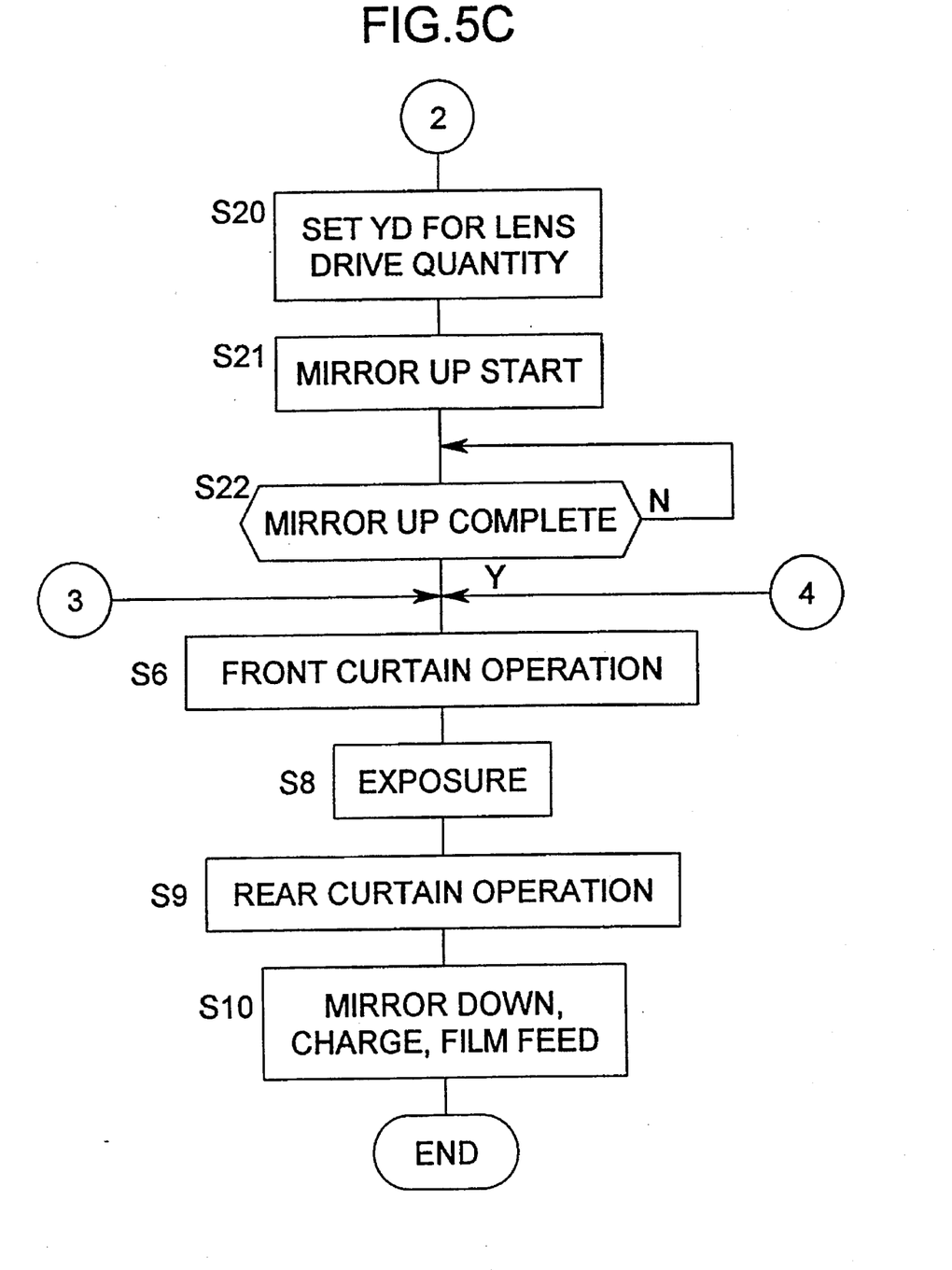

FIGS. 5A through 5C are flow charts showing the operation of the second embodiment. Note that the same step numbers are assigned to steps in which identical processing is performed to that in the flow charts in FIGS. 3A through 3C and that here, mainly the differences are explained.

In the second embodiment, a decision is made in step S15 as to whether or not the blur prevention mode has been selected; if the blur prevention mode has been selected, the operation proceeds to step S31 in which the anticipated drive quantity YD is set for the lens drive quantity. In step S32 that follows, the mirrors start to be elevated at time Q1, which is earlier than in the normal photographing mode by the length of the delay time T. After this, in the same manner as in the first embodiment, when the mirrors are fully elevated the operation goes into standby for the duration of the delay time T and then the exposure processing and post exposure processing are performed.

Thus, since the anticipated drive quantity required for focusing the taking lens on the moving photographic subject at the time of exposure is calculated based on the results of distance measurement, the taking lens is driven in the amount of the calculated anticipated drive quantity, the mirrors start to be elevated earlier than in the normal photographing mode by a preset time T and exposure is performed when the delay time T has elapsed following the completion of mirror elevation, the cumulative effect of these factors, when blur prevention mode is selected, makes it possible to focus the taking lens on a moving photographing subject at the time of exposure and to photograph the moving photographic subject with accurate focus, free of blurring, even if exposure after the mirror elevation is delayed in order to prevent photographic blurs caused when the mirrors are elevated.

Note that in the first and second embodiments described above, for the time elapsing between the completion of lens drive (P2 or P2') and the start point of shutter front curtain operation Q3, a period of time long enough to allow for sufficient attenuation of the vibration of the camera body that occurs as the lens is driven must be assured. Therefore, the delay time T may be extended by adding to the initial delay time T which is set for the prevention of blurs caused by mirror elevation, the time required for prevention of blurs which are caused by driving of the lens.

I claim:

1. A camera having a first calculator coupled to a rangefinder and adapted to calculate an anticipated drive quantity required for focusing a taking lens on a moving photographic subject at a time of exposure based on results of distance measurement performed by said rangefinder, and a lens drive that drives said taking lens in an amount of said anticipated drive quantity calculated by said first calculator, the camera comprising:

a mode selector that selects a blur prevention mode for preventing photographic blurs caused by vibration of the camera body that occurs when mirrors are elevated, a timer that delays an exposure operation of an exposure device by a preset length of delay time after mirror elevation when said blur prevention mode is selected by said mode selector, a second calculator coupled to said rangefinder and adapted to calculate a drive quantity equivalent to a distance traveled by an image surface of said moving photographic subject during the delay time based on the results of distance measurement performed by said rangefinder, and a lens control coupled to said first and second calculator and to said lens drive, said lens control adapted, when said blur prevention mode is selected by said mode selector, to add the drive quantity calculated by said second calculator to said anticipated drive quantity calculated by said first calculator and to drive said taking lens with said lens drive according to a total drive quantity that is the result of that addition.

2. A camera according to claim 1 wherein:
   said rangefinder measures a photographing distance to the photographic subject.

3. A camera according to claim 1 wherein:
   said rangefinder detects a defocus quantity which indicates a focus adjustment state of said taking lens.

4. A camera that calculates an anticipated drive quantity required for focusing a taking lens on a moving photographing subject at a time of exposure based upon results of distance measurement and for driving said taking lens in an amount of a calculated anticipated drive quantity, the camera including a blur prevention method comprising the steps of:

calculating a drive quantity equivalent to a distance traveled by an image surface of said moving photographic subject during delay time T, by which an exposure operation is delayed after mirror elevation, based upon the results of distance measurement, adding said calculated drive quantity to said anticipated drive quantity to obtain a total drive quantity, elevating mirrors while driving said taking lens according to the total drive quantity, and performing exposure when the delay time T has elapsed after said mirrors have been fully elevated.

5. A camera having a first drive quantity calculating means for calculating an anticipated drive quantity required for focusing a taking lens on a moving photographic subject at a time of exposure based on results of distance measurement performed by means for range finding, and a lens driving means that drives said taking lens according to the anticipated drive quantity calculated by said first drive quantity calculating means, the camera comprising:

mode selecting means for selecting a blur prevention mode for preventing photographic blurs caused by vibration of the camera body that occurs when mirrors are elevated, delaying means that delays an exposure operation of an exposure means by a preset length of delay time after mirror elevation when the blur prevention mode is selected by the mode selecting means, second drive quantity calculating means that calculates a drive quantity equivalent to a distance traveled by an image surface of said moving photographic subject during said delay time based on the results of distance measurement performed by said range finding means, and lens control means that, when the blur prevention mode is selected by said mode selecting means, adds the drive quantity calculated by said second drive quantity calculation means to said anticipated drive quantity calculated by said first drive quantity calculating means and, based upon a total drive quantity that is the result of that addition, drives said taking lens with said lens driving means.

6. A camera that calculates an anticipated drive quantity required for focusing a taking lens on a moving photographic subject at the time of exposure based on results of distance measurement and drives said taking lens according to said anticipated drive quantity, the camera comprising:

a mode selector that selects either a blur prevention mode for preventing photographic blurs caused by vibration of the camera body that occurs when mirrors are elevated, or a normal photographing mode, a timer that delays an exposure operation of an exposure device by a preset length of time after the mirror elevation by a mirror drive when the blur prevention mode is selected by said mode selector, and a mirror control that, when the blur prevention mode is selected by said mode selector, starts the mirror elevation by said mirror drive earlier by the preset length of time set on a timer compared to when said normal photographing mode is selected by the mode selector.

7. A camera according to claim 6 wherein:

said results of distance measurement are a photographing distance to the photographic subject.

8. A camera according to claim 6 wherein:

said results of distance measurement are a defocus quantity which indicates a focus adjustment state of said taking lens.

9. A camera that calculates an anticipated drive quantity required for focusing a taking lens on a moving photographing subject at a time of exposure based upon results of distance measurement and drives said taking lens in an amount of said calculated anticipated drive quantity, said camera including a blur prevention method comprising the steps of:

starting mirror elevation earlier than in a normal photographing mode by a preset length of delay time T, and performing exposure when the delay time T has elapsed after completion of mirror elevation.

10. A camera that calculates an anticipated drive quantity required for focusing a taking lens on a moving photographic subject at a time of exposure based on results of distance measurement and drives said taking lens according to said anticipated drive quantity, the camera comprising:

a mode selecting means that selects either a blur prevention mode for preventing photographic blurs caused by vibration of the camera body that occurs when mirrors are elevated, or a normal photographing mode, a delaying means that delays an exposure operation of an exposure device by a preset length of time after mirror elevation by a mirror driving means when the blur prevention mode is selected by said mode selecting means, and a mirror control means that, when the blur prevention mode is selected by said mode selecting means, starts the mirror elevation by a mirror driving means earlier by the preset length of time set on said delaying means compared to when said normal photographing mode is selected by said mode selecting means.

* * * * *